May 1, 1956 R. H. FULLERTON 2,743,755
TRACTION DEVICE FOR VEHICLE WHEELS
Filed Sept. 21, 1953 3 Sheets-Sheet 1
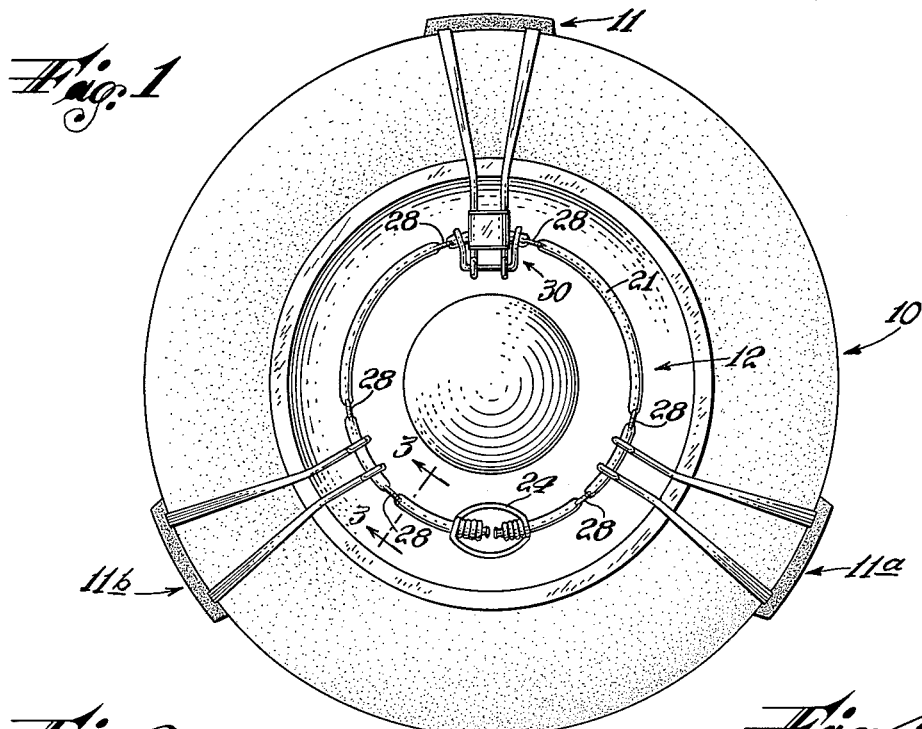
Fig. 1
Fig. 2
Fig. 4
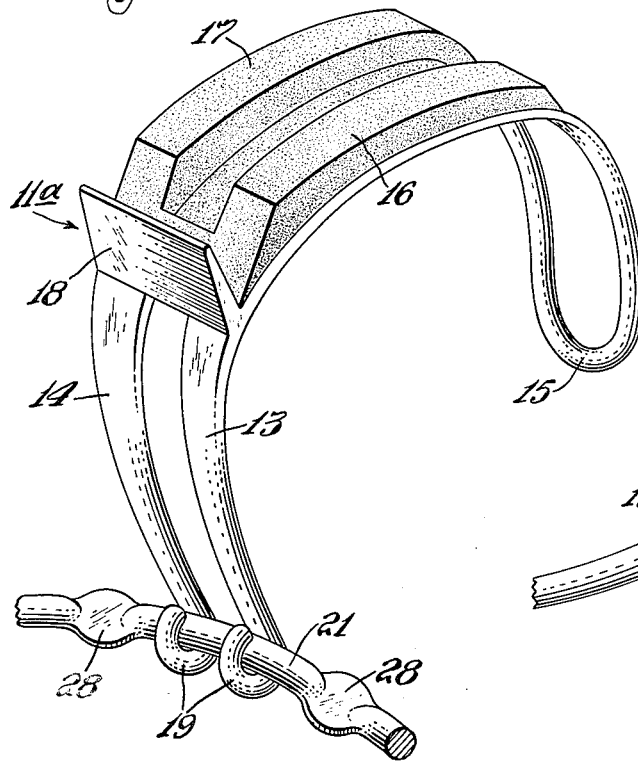
Fig. 3
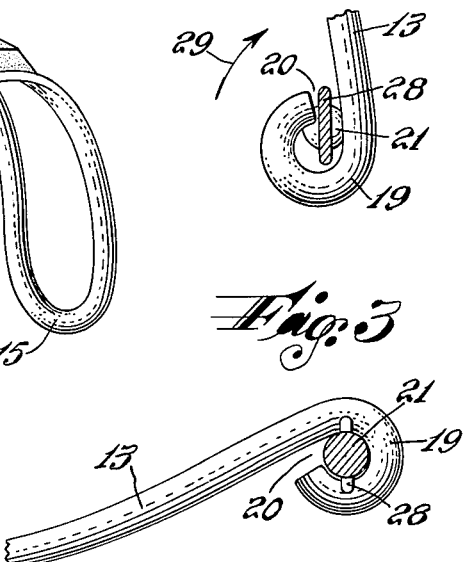
INVENTOR.
Robert H. Fullerton
BY Richard Ward
AG'T May 1, 1956 R. H. FULLERTON 2,743,755
TRACTION DEVICE FOR VEHICLE WHEELS
Filed Sept. 21, 1953 3 Sheets-Sheet 2
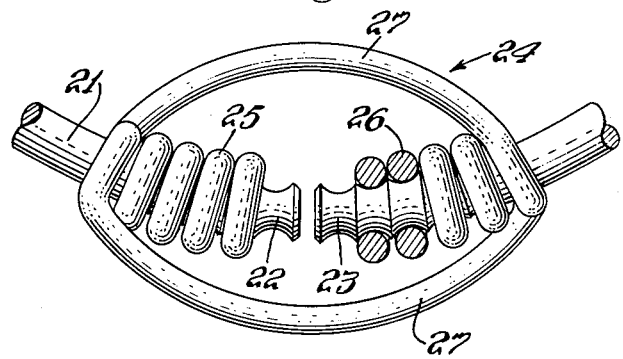
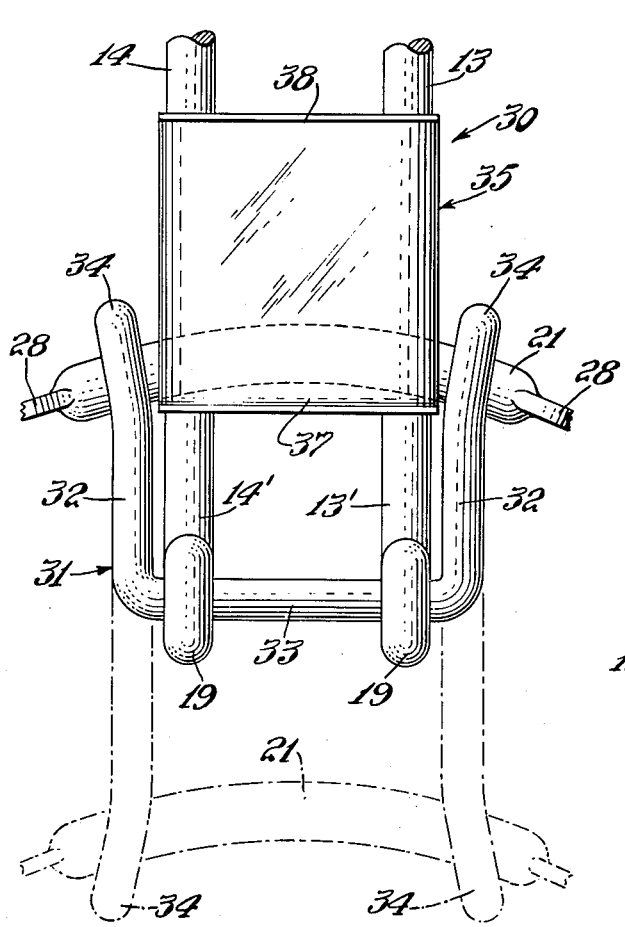
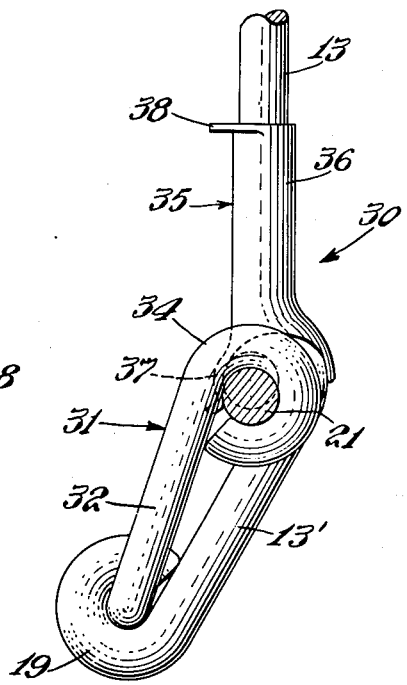
INVENTOR.
Robert H. Fullerton
BY
AG'T

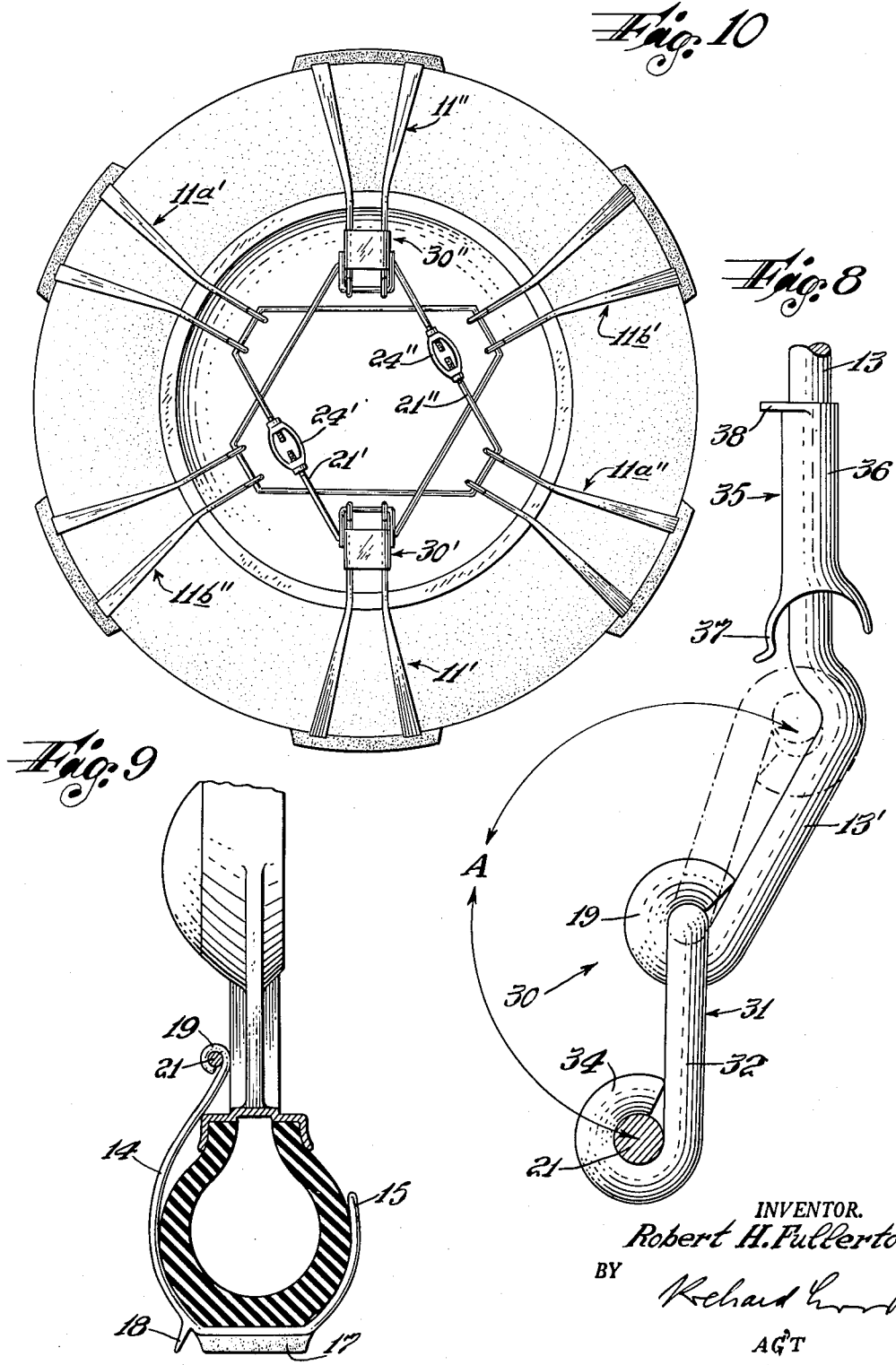

United States Patent Office 2,743,755
Patented May 1, 1956

2,743,755

TRACTION DEVICE FOR VEHICLE WHEELS

Robert H. Fullerton, Newton, N. J., assignor to August Heinle, Dover, N. J.

Application September 21, 1953, Serial No. 381,282

4 Claims. (Cl. 152—219)

The present invention relates generally to improvements in traction devices for vehicle wheels, and is particularly directed to a device for installation on a pneumatic or other rubber tire, for example, an automobile tire, for improving the traction thereof on soft or slippery surfaces resulting from snow, ice, rain and the like.

An object of the invention is to provide improved traction devices of the described character which are easily placed upon, or removed from, a vehicle wheel without requiring the use of any special tools and while the vehicle wheel remains in contact with the supporting surface.

Another object is to provide a traction device of the described character which is adapted to fit upon automobile tires of different sizes, and wherein the traction elements thereof are held against the periphery of the tire with a yieldable and adjustable force to eliminate the noise commonly associated with loose fitting traction devices and to avoid any injury to the tire structure.

A further object is to provide a traction device including several traction elements mounted on a common securing member, and wherein the traction elements are individually removable from the securing member to permit replacement of any one of such traction elements in case of damage to the structure thereof.

A still further object is to provide a traction device of the described character which increases the traction both in the direction of normal movement or travel of the associated vehicle and in the lateral direction thereby to prevent sidesway or skidding of the vehicle on soft or slippery surfaces.

A still further object is to provide a traction device of the described character which lies close to the vehicle wheel when installed on the latter to prevent contact with, and damage to, the adjacent fender of the vehicle, and which includes a locking safety device to avoid inadvertent loosening of the traction device and its removal from the vehicle wheel.

In accordance with the present invention, a traction device includes several, preferably three or more, traction elements each formed of a pair of steel hook shaped portions adapted to fit transversely over the periphery of a tire and joined together at one end by a loop portion at the inner side of the tire. Rubber cleats are molded on the parts of the hook shaped portions which engage the road-contacting surface of the tire, and the free ends of the hook portions are in the form of eyes. The eyes of all but one of the traction elements receive a common locking ring, which is either circular or multi-lateral, for example, substantially triangular, and is formed to fit closely against the outer side of the vehicle wheel. The remaining traction element has a locking bail which is rotatably mounted in the eyes at the free ends of the hook-shaped portions thereof and also at a spaced axis on the common locking ring so that the locking bail is swingable between a released position extending radially inward from the eyes of the related traction element and a locking position extending radially outward beyond the eyes of the related traction element for radially tightening the traction elements on the tire. The common ring is further provided with a resilient turnbuckle for completing the tightening of the traction elements on the tire after the locking bail has been rocked to its locking position, and a safety member is movable on the traction element connected to the locking bail and operates to retain the latter in its locking position. The common ring is flattened in one direction and widened in the direction at right angles thereto at suitable locations to establish the positions of the traction elements on the ring and also to permit individual removal of the traction elements by slipping the partly open eyes of the latter over the flattened locations. Further, in addition to the rubber cleats on the hook shaped portions extending laterally or transversely with respect to the road contacting surface of the tire, each of the traction elements preferably includes a cleat extending between the hook shaped portions at the outer ends of the rubber cleats and adapted to grip the supporting surface to prevent side-sway or skidding in the lateral direction.

The above and other objects, features and advantages of the present invention will be apparent in the following detailed description of illustrative embodiments thereof when read in connection with the accompanying drawings forming a part hereof, and wherein:

Fig. 1 is an elevational view of a traction device embodying the present invention shown mounted upon a vehicle tire;

Fig. 2 is a perspective view, on an enlarged scale, of a traction element included in the device of Fig. 1;

Fig. 3 is a fragmentary sectional view taken along the line 3—3 of Fig. 1 but on an enlarged scale;

Fig. 4 is a view similar to Fig. 3, but showing the elements thereof positioned for mutual separation;

Fig. 5 is an enlarged detail elevational view, partly broken away and in section, of a resilient turnbuckle included in the device of Fig. 1;

Fig. 6 is an enlarged elevational view of a locking link assembly included in the device of Fig. 1, and shown in full lines in its locked position and in broken lines in its released position;

Fig. 7 is a side elevational view of the locking link assembly of Fig. 6 shown in its locked position;

Fig. 8 is a view similar to Fig. 7, but showing the assembly in its released position;

Fig. 9 is a radial sectional view showing traction device embodying the invention installed on a vehicle tire; and Fig. 10 is a view similar to Fig. 1 but showing another embodiment of the invention.

Referring to the drawings in detail, and initially to Fig. 1 thereof, a traction device embodying the present invention is there shown and generally indicated by the reference numeral 10. The traction device 10 includes a plurality, three being illustrated, of traction elements, generally indicated by the reference numerals 11, 11a and 11b, and a common locking ring assembly which is generally indicated by the reference numeral 12. The traction elements 11, 11a and 11b are substantially similar and, as seen in Fig. 2, each of said traction elements includes two hook-shaped portions 13 and 14, preferably formed of tempered steel, which are joined together by an integral loop portion 15. The hook-shaped portions 13 and 14 are dimensioned to extend transversely around a vehicle tire with loop portion 15 engaging against the inside face of the tire while the free end parts of hook-shaped portions 13 and 14 extend radially inward over the outer face of the tire (Fig. 9). Rubber cleats 16 and 17, preferably having wire reinforcement embedded therein, are molded on the parts of the hook-shaped portions 13 and 14, respectively, which engage the periphery of the tire, and a metal flange or cleat 18 extends between portions 13 and 14 at the outer ends of rubber cleats 16 and 17 to provide lateral traction and prevent relative movement of portions 13 and 14. The free ends of portions 13 and 14 are bent forming eyes 19 which are not completely closed to provide open gaps 20 (Figs. 3 and 4).

The common locking ring assembly 12 includes a split ring 21, which is circular in the embodiment of Fig. 1, and has oppositely threaded ends 22 and 23 (Fig. 5). A resilient turnbuckle 24 includes two opposite coiled springs 25 and 26 which are screwed on the threaded end portions 22 and 23, respectively, of split ring 21 and are connected, at their remote ends, by resilient spanning arms 27. Thus, by rotating the resilient turnbuckle 24 in one direction or the other, the ends 22 and 23 can be either spread apart or drawn together to increase or decrease the effective circumference and diameter of the locking ring assembly. Split ring 21 preferably is formed with a circular cross-section having a diameter greater than the gaps 20 of the traction elements 11a and 11b, and, at suitable locations, the ring 21 has pairs of flattened portions 28 establishing the relative positions of the traction elements 11, 11a and 11b on the locking ring and permitting easy removal and replacement of the traction elements 11a and 11b. The portions 28 of the locking ring are flattened in the axial direction to increase the axial dimension of the ring at such locations above the inner diameter of the eyes 19, while the thickness of the portions 28 is reduced to less than the spread of the gaps 20. Each pair of flattened portions 28 is spaced apart circumferentially a distance slightly greater than the spacing between the eyes 19 of the related traction element so that, when the eyes 19 receive ring 21 between a pair of flattened portions 28 with the traction element extending radially outward from the locking ring, the flattened portions 28 cannot pass through eyes 19 (Fig. 3) and prevent movement of the traction element along the locking ring. However, when the hook-shaped portions 13 and 14 of the traction element are rocked, in the direction of arrow 29 (Fig. 4) away from their radially extending positions, the traction element can then be displaced circumferentially, first in one direction and then the other, to successively register the eyes 19 with the adjacent flattened portions 28 which can then pass through the gaps 20 thereby permitting removal of the related traction element from the common locking ring.

At least one of the traction elements, the element 11 in the illustrated embodiment, is connected to the common locking ring 21 by a locking link assembly which is generally identified by the reference numeral 30. Referring specifically to Figs. 6, 7 and 8, it will be seen that the locking link asembly 30 includes a U-shaped locking link 31 which includes two parallel arms 32 and a cross-member 33 connecting the arms at one end and rotatably received in the eyes 19 of portions 13 and 14 of traction element 11. The free ends of arms 32 are in the form of eyes 34 which rotatably grasp ring 21 between the related flattened portions 28 (Fig. 6) so that locking link 31 may be swung relative to traction element 11 between an extended or released position extending radially inward from the traction element, as shown in broken lines in Fig. 6 and in Fig. 8, and a locked position in which the link 31 extends radially outward from the eyes 19, as shown in full lines in Fig. 6 and in Fig. 7. The hook-shaped portions 13 and 14 of traction element 11 are provided with offset and angularly bent parts 13' and 14' (Figs. 7 and 8) extending from the eyes 19 so that the link 31 attached to ring 21 can swing through an angle A (Fig. 8) greater than 180 degrees in moving from its released position to its locked position. Thus, when the link 31 is in its locked position (Fig. 7), ring 21 is disposed inwardly beyond the top dead center and bears against the offset parts 13' and 14' so that an outwardly directed radial force imposed on the traction element 11 urges the ring 21 against the parts 13' and 14' and does not cause swinging of link 31 towards its released position.

Further, in order to ensure retention of link 31 in its locked position, the locking link assembly 30 also includes a safety member 35 formed of sheet metal and having parallel tubes 36 at the opposite side edges thereof which are slidable on the portions 13 and 14 of element 11 above the offset parts 13' and 14'. An arcuate resilient catch 37 extends from the lower edge of safety member 35 and is formed to partially embrace ring 21 when safety member 35 is lowered with locking link 31 in its locked position (Fig. 7). Preferably, safety member 35 is formed with a flange 38 along its upper edge which may be conveniently grasped for lifting the safety member to a raised position (Fig. 8) releasing ring 21 from catch 37 so that the link 31 can then be manually swung from its locked position (Fig. 7) past top dead center to its released position (Fig. 8).

The traction device 10 described above can be easily installed on a vehicle tire as follows:

With locking link 31 in its released position (Fig. 8) and with the resilient turnbuckle 24 turned to provide the maximum spread between ends 22 and 23 of the locking ring 21, traction element 11 is extended over the top of the tire from the front of the latter to initially support the traction device on the vehicle wheel, and then traction elements 11a and 11b are extended around the tire at locations spaced approximately 120 degrees from element 11. Next, locking link 31 is manually rocked or swung to its locked position and secured in that position by lowering of the safety member 35. Such movement of locking link 31 serves to draw traction element 11 radially inward onto the top of the tire and to take up all of the play or looseness of the traction elements on the tire. Finally, the turnbuckle 24 is rotated to draw together ends 22 and 23 of the locking ring 21 thereby tightening the traction elements 11, 11a and 11b on the tire even though the latter may vary, to some extent, from standard dimensions. After traction device 10 has been adjusted, by turnbuckle 24, to a particular tire, the device can be installed on, and removed from, that tire without manipulation of the turnbuckle, unless wear of the tire makes further adjustment necessary. As seen in Figs. 1 and 9, when traction device 10 is installed on a vehicle tire, all of the traction elements lie close against the tire while the locking ring 21 rests in the usual depression around the wheel hub, so that contact of any part of the traction device with structure of the vehicle, for example, the fender around the tire, during rotation of the wheel is avoided. Further, the spaced rubber cleats 16 and 17 ensure that adequate driving traction will be provided even when running on soft or slippery surfaces, while the cleat 18 on each traction element provides gripping in the lateral direction to prevent side-sway or skidding.

In removing the traction device 10 from a vehicle tire, the vehicle wheel is stopped in a position in which the traction elements 11, 11a and 11b are all clear of the supporting surface, and the safety member 35 is moved to permit swinging of link 31 to its released position which provides sufficient radial clearance between the traction elements and the tire to permit removal of the traction elements.

Although locking ring 21 of the embodiment described above and illustrated in Fig. 1 is of circular configuration and has three traction elements mounted thereon, it is to be understood that the configuration of the locking ring and the number of traction elements employed on a tire may be varied without departing from the present invention. For example, as shown in Fig. 10, a traction device embodying the present invention may include a multilateral, substantially triangular, locking ring 21' having its split ends connected by a resilient turnbuckle 24', similar in construction to the previously described turnbuckle 24, while traction elements 11a' and 11b', corresponding to the previously described elements 11a and 11b, are connected directly to two of the apices of the triangular ring 21' and a third traction element 11' is connected, through a locking link assembly 30', to the third apex of ring 21', with element 11' and assembly 30' corresponding to the previously described element 11 and assembly 30. Further, as shown in Fig. 10, a second traction device including triangular ring 21", turnbuckle 24", elements 11", 11a" and 11b", and locking assembly 30" may be mounted on the same tire as the device having traction elements 11', 11a' and 11b' to provide a total of six traction elements if road or load conditions require the increased traction resulting therefrom.

From the foregoing, it is apparent that the present device provides a traction device which may be mounted on, or removed from, a vehicle wheel while the latter rests on a supporting surface, that is, without requiring jacking-up of the wheel; that no special tools or equipment are required for effecting such mounting or removal of the traction device; that, by reason of the turnbuckle adjustment of the locking ring, the traction device can be securely mounted on different size tires, while the resiliency of the turnbuckle holds the traction elements against the tire with a yieldable force to prevent damage to the tire and at the same time eliminate the noise caused by running with loose-fitting traction devices; that the several traction elements can be individually removed from the common locking ring for replacement of a damaged or worn-out traction element; and that the cleats 16, 17 and 18 provide both running and lateral traction.

While specific embodiments of the invention have been described in detail and illustrated in the drawings, merely by way of example, it is to be understood that the invention is not limited to these precise embodiments, and that various changes and modifications may be effected therein, by one skilled in the art, without departing from the spirit and scope of the invention as defined in the appended claims.

What is claimed is:

1. A traction device for removable mounting on the tire of a vehicle wheel; said device comprising several traction elements each adapted to embrace the periphery of the tire, a common split locking ring disposed at the outside of the vehicle wheel and having its ends oppositely threaded, a turnbuckle including connected together, oppositely coiled springs threaded on said ends of the split ring, a locking link pivotally connected between said ring and one of said traction elements for radially releasing and drawing in said one traction element relative to said ring, and means securing the others of said traction elements to said ring so that, after said one traction element has been radially drawn in by said locking link to hold said traction elements on the periphery of the tire, said turnbuckle provides for further tightening of the traction elements on the tire and forms a resilient coupling between said ends of the split locking rings, whereby such further tightening urges the traction elements against the tire with an adjustably yieldable force to prevent damage to the tire.

2. A traction device for removable mounting on the tire of a vehicle wheel; said device comprising several traction elements each adapted to embrace the periphery of the tire, a common split locking ring disposed at the outside of the vehicle wheel and having a turnbuckle connecting the ends thereof, a locking link pivotally connected between said ring and one of said traction elements for radially releasing and drawing in said one traction element relative to said ring, each of the others of said traction elements having partly open eyes formed to embrace said ring, said ring having pairs of axially flattened portions at spaced apart locations to normally retain said eyes of said other elements between a related pair of said flattened portions thereby establishing the positions of said other traction elements on said ring, said other traction elements being swingable relative to said ring to align said flattened portions with the gaps of said partly open eyes so that said flattened portions may then pass through said gaps to permit individual removal and replacement of said other traction elements, said turnbuckle providing for further tightening of the traction elements on the tire after said one traction element has been radially drawn in by said locking link to hold said traction elements on the periphery of the tire.

3. A traction device for removable mounting on the tire of a vehicle wheel; said device comprising several traction elements each adapted to embrace the periphery of the tire, a common split locking ring disposed at the outside of the vehicle wheel and having a turnbuckle connecting the ends thereof, a locking link pivoted on said ring and one of said traction elements about spaced parallel axes and swingable from a released position, in which the pivoting axis on said ring is disposed radially inward of the pivoting axis on said one traction element, and a radially tensioning position, in which said pivoting axis on the ring is disposed radially outward of said pivoting axis on said one traction element thereby to radially draw in said one traction element, a safety member slidable radially on said one traction element and having a resilient catch thereon embracing said ring at the outer side thereof when said locking link is in said tensioning position and the safety member is disposed radially inward on said one traction element so that said safety member then positively prevents swinging of the locking link to its released position while the engagement of said resilient catch with said ring yieldably resists radially outward movement of said safety member on said one traction element, and means securing the others of said traction elements to said ring.

4. In a traction device of the described character having several traction elements and a common ring for securing together said traction elements; a locking assembly joining at least one of said traction elements to said ring, said locking assembly comprising a locking link pivoted on said ring and the related traction element about spaced parallel axes and swingable between a released position, in which the pivoting axis on the ring is disposed radially inward of the pivoting axis on said related traction element, and a tensioning position, in which the radial positions of said axes are reversed to draw-in said related traction element with respect to said ring, and a safety member radially slidable on said related traction element and having a resilient catch thereon embracing said ring at the side of the latter toward which the ring moves in swinging of said locking link from said tensioning position toward said released position when said safety member is disposed radially inward on said related traction element and said locking link is in said tensioning position, so that said safety member then positively prevents swinging of said locking link toward its released position while said resilient catch yieldably resists radial outward movement of said safety member to free said ring.

References Cited in the file of this patent

UNITED STATES PATENTS

| 1,822,748 | Rivers | Sept. 8, 1931 |
| 1,882,376 | Weber | Oct. 11, 1932 |
| 2,067,121 | Grout | Jan. 5, 1937 |
| 2,198,906 | Conway | Apr. 30, 1940 |
| 2,553,712 | Jensen | May 22, 1951 |
| 2,581,578 | Cruse | Jan. 8, 1952 |